(12) United States Patent
Wirtz et al.

(10) Patent No.: US 8,717,384 B1
(45) Date of Patent: May 6, 2014

(54) IMAGE FILE FORMAT ARTICLE OF MANUFACTURE

(75) Inventors: Michael Matthew Wirtz, Ridgecrest, CA (US); David Daniel Schaeffer, Ridgecrest, CA (US); An Vinh, Ridgecrest, CA (US); Stephanie Stites, Ridgecrest, CA (US); Patrick Robert Simpson, Ridgecrest, CA (US); Brett Thomas Edwards, Ridgecrest, CA (US); Frank Joseph Modlinski, Ridgecrest, CA (US); Nathan Joseph Kielman, Ridgecrest, CA (US); William Rodney Ditzler, Ridgecrest, CA (US)

(73) Assignee: The United State of America as Represented by the Secretary of the Navy, Washington, DC (US)

( * ) Notice: Subject to any disclaimer, the term of this patent is extended or adjusted under 35 U.S.C. 154(b) by 890 days.

(21) Appl. No.: 12/924,801

(22) Filed: Sep. 28, 2010

(51) Int. Cl.
| | |
|---|---|
| *G09G 5/00* | (2006.01) |
| *G06K 9/00* | (2006.01) |
| *G06K 9/62* | (2006.01) |
| *G06K 9/36* | (2006.01) |
| *G06K 9/32* | (2006.01) |
| *G06F 7/00* | (2006.01) |

(52) U.S. Cl.
USPC ........... 345/629; 345/619; 345/634; 382/113; 382/209; 382/284; 382/293; 382/294; 707/791; 707/793; 707/796; 707/803; 348/144

(58) Field of Classification Search
USPC .......... 345/419, 427, 619, 629, 634; 382/103, 382/113, 154, 209, 232, 284, 285, 293, 382/294; 707/790–793, 796, 802–804, 821, 707/822, 825; 348/143–148
See application file for complete search history.

(56) References Cited

U.S. PATENT DOCUMENTS

| | | | |
|---|---|---|---|
| 6,507,660 B1 | 1/2003 | Wirtz et al. | |
| 6,988,049 B1 | 1/2006 | Wirtz et al. | |
| 7,440,610 B1 | 10/2008 | Wirtz et al. | |
| 8,064,640 B2 | 11/2011 | Wirtz et al. | |
| 2008/0181454 A1* | 7/2008 | Wirtz et al. | 382/103 |
| 2010/0180191 A1* | 7/2010 | Taber | 715/230 |

OTHER PUBLICATIONS

Manso, M. A., et al. "Automatic metadata extraction from geographic information." 7th Conference on Geographic Information Science (AGILE 2004), Heraklion, Greece. 2004, pp. 379-385.*
Shin, Andrew, "Non-Final Rejection", Dec. 6, 2013, pp. 1-11.*
Department of Defense Interface Standard National Imagery Transmission Format Version 2.1, May 1, 2006, USA.
U.S. Appl. No. 12/587,322, Michael Mathew Wirtz, et al.
U.S. Appl. No. 12/924,794, Michael M. Wirtz, et al.
U.S. Appl. No. 13/374,622, Michael M. Wirtz, et al.
U.S. Appl. No. 13/374,618, Michael M. Wirtz, et al.

* cited by examiner

*Primary Examiner* — Wesner Sajous
*Assistant Examiner* — Andrew Shin
(74) *Attorney, Agent, or Firm* — Christopher L. Blackburn

(57) ABSTRACT

An image file format article of manufacture for a PFI.

11 Claims, 1 Drawing Sheet

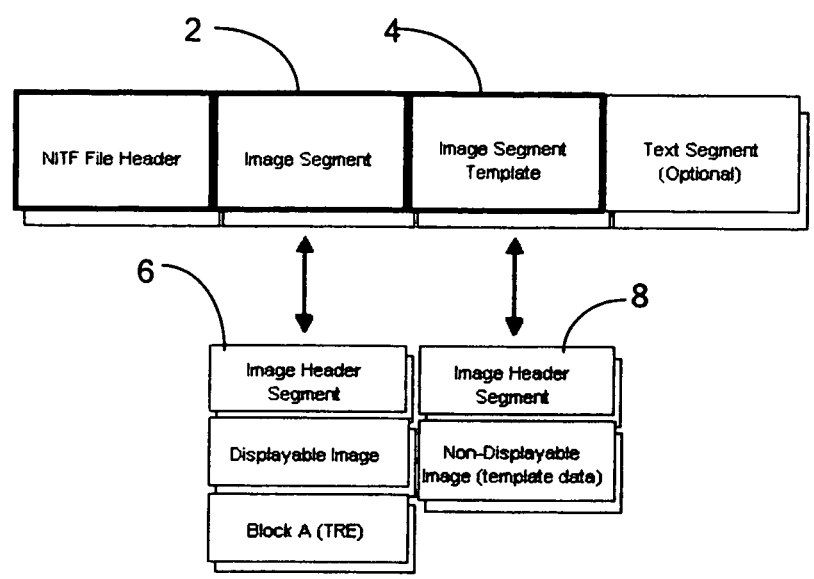

IMAGE FILE FORMAT ARTICLE OF MANUFACTURE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to an image file format article of manufacture.

BRIEF DESCRIPTION OF THE DRAWINGS

FIG. 1 illustrates a general overview of a Precision Fires Image generation process.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION

Embodiments may be implemented as an apparatus or article of manufacture using programming and/or engineering techniques to produce software, firmware, hardware, or any combination thereof. The term "article of manufacture" as used herein is intended to encompass one or more computer programs and data files accessible from and/or stored on one or more computer-readable medium (devices, carriers, or media), including, for example, a magnetic storage media, "floppy disk", CD-ROM, RAM, a PROM, an EPROM, a FLASH-EPROM, any other memory chip or cartridge, a file server providing access to the programs via a network transmission line, holographic unit, etc. Of course, those skilled in the art will recognize that many modifications may be made to this configuration without departing from the scope of the present invention.

Embodiments of the invention include a computer readable medium encoded with a data structure. The data structure includes an image file format including a PFI file Header that defines information needed to display a Precision Fires Image (PFI). The PFI is an overhead satellite image of an object with a geo-referenced, three dimensional (3-D) template of the object. The geo-referenced three dimensional (3-D) template provides a translation from image coordinates to ground coordinates. The image file format further includes an image segment pertaining to a "displayable image", and an image segment pertaining to a "non-displayable" template image.

A Precision Fires Image (PFI) is an image from which a user may designate a point that is converted to a precision targeting coordinate. The PFI is a working National Imagery Transmission Format (NITF) Version 2.1 file extension that incorporates the Digital Point Positioning Data Base (DPPDB) structure as the basis for development. The PFI provides a user with the ability to precisely designate items of interest within their field of view and area of influence by simply positioning a single marker, a cursor, on the desired item, a target. Precision targeting coordinates reduce non-combatant casualties, increase combatant casualties, reduce collateral damage, use munitions effectively and lower delivery costs while providing immediate detailed information regarding local terrain.

A PFI electronic file ("PFI file") is generated using a National Imagery Transmission Format (NITF) file that consists of a single overhead satellite image, also known as a surveillance image, and a geo-referenced, three dimensional (3-D) template derived from a stereo referenced image (also referred to as "non-displayable" image). Several types of stereo referenced imagery are available and they include, the Digital Point Positioning Database (DPPDB), the Controlled Image Base (CHB), Digital Terrain Elevation Data (DTED) and vector maps such as VMAP or its commercial equivalents. Regardless of the type of stereo reference imagery used, the user is then forced to select one of two processing paths.

One path uses the stereo referenced image and a surveillance image provided from either a surveillance satellite or aircraft and invokes portions of the Digital Precision Strike Suite-Scene Matching (DPSS-SM) processing. DPSS-SM is a good path when the stereo referenced imagery and a surveillance image are both available. This is due to the timeliness and relevancy of the information included within the tactical image since a current satellite image or other current tactical image may present road movable targets.

A second path is selected in the absence of a surveillance image. The PFI software application is used to generate a PFI directly from the stereo referenced imagery when only the stereo referenced imagery is available. Regardless of the image source used to generate the PFI, the PFI enabled hand held is then used to accept a point designation from the user that is converted to a precision targeting coordinate and passed to the guided munitions.

During PFI file generation, the three dimensional (3-D) template and the stereo-referenced image are correlated, geo-registering a visible image with World Geodetic System 1984 (WGS-84) coordinate data, creating a single image file. To obtain the WGS-84 coordinates with height and elevation errors; an operator can perform a "single click" on the image. The PFI creation process occurs when the DPPDB stereo reference imagery pair is loaded into a PFI generating application. The user defines a region of interest by selecting a section from the left and right reference pair as the framework for an overlying three dimensional (3-D) template. One of the image pairs or a single tactical NITF image is used as the base image of the overall PFI file. Finally, the three dimensional (3-D) template and base image are correlated using an offset scheme to map the image pixel positions; and the final PFI product is created. Each stereo reference image undergoes extensive edge extraction, using edge extraction algorithm (in this case we used the Sobel algorithm). Once the imagery has completed edge erosion, it undergoes the correlation process where pixels are matched and template geographic locations are implemented.

A PFI is intended to be used on systems that lack the resources to run either the Precision Strike Suite for Special Operations (PSS-SOF) or Digital Precision Strike Suite-Scene Matching (DPSS-SM) applications. A typical file size nominally covers an area of 4×4 kilometers, allowing the image to be transmitted and viewed on low capacity computing devices with minimal storage and bandwidth constraints. Because of its size, multiple PFI image sets can be deployed at a given time, per area of focus. PFIs deployed on handheld devices also provide a platform for imagery and targeting capabilities that are beneficial to lower level echelon mission requirements.

The Digital Precision Strike Suite-Scene Matching (DPSS-SM) or Precision Fires Image Generator (PFIG) applications can be used to create an individual PFI product. DPSS-SM is a good source when overhead satellite imagery is directly available, due to the timeliness and relevancy of this data; PFIG, however, can be used to generate a PFI directly from the reference imagery if overhead imagery is not available. Both applications use an NGA validated algorithm to extract data from DPPDB stereo reference imagery in order to generate individual PFI files.

An individual PFI is chipped from the DPPDB sizing up to 4096×4096 pixels. Support data, including latitude, longitude, elevation, CE, and LE, are implemented into the PFI structure and are essential in target designation and accuracy. PFIG performs PFI generation solely using DPPDB imagery for the correlation of a three dimensional (3-D) template and a single NITF image as the base for image pixilation. The DPSS-SM application uses the same correlation process but includes the use of up-to-date tactical imagery in the correlation process.

PFI supporting applications provide users with the capability to perform parallel operations in image exploitation and management. On a desktop platform, operators are expected to generate PFI images (using PFIG and DPSS-SM applications), and perform image categorization and file maintenance to include the exploitation of imagery. Operators then establish handheld synchronization for PFI management (using the Handheld Sync application), deploy files onto handheld PFI viewing applications, and perform minimal exploitation and coordinate generation (while in a dismounted state).

In some embodiments, PFI files are stored as raw uncompressed images. In other embodiments, PFI files are stored using Joint Photographic Experts Group (JPEG) or JPEG 2000 compression; implementations of binary values, however, are not compressed within the PFI file structure.

The PFI file structure and content conforms to the NTTFS, NITF Version 2.1 format specification in order to maintain interoperability between systems and differing agencies.

In some embodiments, compression, including, for example JPEG and JPEG 2000, and Gridded Reference Graphic (GRG) Text enhancements are included to allow for better compression, easier transmission, and more capability. Compression will be specified in the Image Header "IC" field.

Some embodiments of the invention include a scale integer in the "Image Segment Template" (4 in FIG. 1) of the PFI Header. The addition of the scale integer improves template error calculation and enhances the image template's scalability when stretched over the underlying image segment. FIG. 2 identifies both image segments.

The PFI file format configuration consists of multiple correlated files. This configuration correlates a single "displayable" image segment with a "non-displayable" image segment. The "non-displayable" image segment includes correlated DPPDB stereo reference data and extended binary data allocated for PFI implementation.

The "displayable" image is the base image segment that conforms to the NTTF 2.1 standard file header structure; it is the underlying image that provides visible geographic features. The displayable image can also be stored as raw uncompressed pixel values or JPEG compressed.

The "non-displayable" template image will perform as the non-destructive overlay to the "displayable" image, with offsets to the X and Y values on the coordinate plane. The following syntax identifies the data structure for the "non-displayable" template within the PFI file Header:

```
struct PFIData
{
Smallint row;
Smallint col;
float TemplateX;
float TemplateY;
float TemplateZ;
float TemplateDir;
};
struct PFIHeader
{
float Version;
bool IsSAR;
float CEP;
float CEM;
float CE90;
float LEP;
float LEM;
float LE90;
float SigmaX2;
float SigmaY2;
float SigmaXY;
double AimpointX;
double AimpointY;
double AimpointZ;
int scale; <- -PFI 3.0 Version Implementation- ->
};
```

The PFI structure implements a Tagged Record Extension ("TRE") segment. This segment supports coordinate accuracy of the geo-location output for the four corner points. The TRE segment implementation will improve accuracy approximately one tenths of the standard NITF coordinate output. The TRE extension adheres to the standard TRE outlined in the "The Compendium of Controlled Extensions for the NITF 2.1.

GRGs—a product with an overprinted grid that may be either a non rectified image with a common reference grid or a rectified image with a precise metric grid—and text labels are user-defined labels implemented in the PFI file during PFI creation using the PFI Generator software application. GRG and text labels designate specified X and Y pixels on a PFI image.

The number of template point values is computed by subtracting the "Number of Columns" from the "Size of the PFI Header" divided by the "Size of the PFI Data."

Number of Template Points=(Number of Columns)–
(Size of PFI Header/Size of PFI Data)

The PFI binary code was developed using an Intel/AMD X86 processor on a Windows operating system. For development purposes, PFI byte ordering uses the "little endian" sequencing of data, which is determined at the machine processing level. For interoperability on systems other than the Windows platform (i.e., Macintosh/Sun Systems), the sequence of data must be parsed in the reverse order.

In order to maintain the integrity of PFI functionality on target based systems, the mathematical model and error terms will not be included in this document. As a result, a Dynamic Link Library (DLL) is available in order to provide third party applications with the capability to read PFI embedded information. DLL implementation is available for Windows operating systems and includes the code, data, and resources required for executing PFI generation.

Table A-1 identifies PFI file Headers. The table identifies PFI file Headers using a field ID, name (and associated information/function), size, and value range; however, the field ID, name, size and value range can vary without departing from the invention.

TABLE A-1

| FIELD ID | NAME | SIZE | VALUE RANGE | TYPE |
| --- | --- | --- | --- | --- |
| | PFI File Header (Binary) | | | |
| FHDR | File Profile Name: A binary coded character string indicating the NITF standard. | 9 | NITF | R |
| FVER | File Version: Indicates this file is formatted using version 2.1 of the NITF. | 5 | 02.10 | R |
| CLEVEL | Complexity Level: This field includes a complexity level of 3 or 5 based on the range value. | 2 | Follow NITF default values | R |
| STYPE | Standard Type: Standard type or capability. | 4 | BF01 | R |
| OSTAID | Originating Station ID: This field indicates the originating organization. The value indicates versions of the PFIG/DPSS-SM applications of which the image was created. | 10 | PFIG - Version Number or DPSS-SM - Version Number | R |
| FDT | File Date & Time: This field specifies the date the file was created. | 14 | YYYYMMDDHHMMSS | R |
| FTITLE | PFI ID: This field specifies the image as a PFI and also indicate the originating PFI generating application, image corner points, and image date. The initial value is "D" if the file was created with PFIG software. The initial value is "T" if file was created with DPSS-SM. The PFI ID also includes the 4 corner point values, the image date, and rough estimate of the coordinate quality using a letter character (see the example below). EX: <PFI-D:354136N1174037W 354102N1174047W354110N 1174128W354145N1174118 W:20010322>: G | 80 | Value indicates PFI — D or T for originating source of production. Corner Point Values: Follow NITF default values Image Date: YYYYMMDD The following single character values indicating coordinate accuracy: G = green (good accuracy) Y = yellow (ok accuracy) O = orange (low accuracy) R = red (no accuracy) | R |
| FSCLAS | File Security Classification: This field includes a value based on the classification of the underlying support data. | 1 | Follow NITF default values | R |
| FSCLSY | File Security Classification System: This field indicates the national or multinational security system used to classify the file. | 2 | Follow NITF default values | O |
| FSCODE | File Codewords: This field indicates that no security compartments are associated with the file. | 11 | Follows NITF default values | O |
| FSCTLH | File Control and Handling: This field includes security handling instructions in accordance with the file. | 2 | Follows NITF default values | O |
| FSREL | File Releasing Instructions: This field indicates the countries or groups to which the files are authorized. | 20 | Follows NITF default values | R |
| FSDCTP | File Declass Type: This field includes an identifying code for the classification authority. | 2 | Follows NITF default values | O |
| FSDCDT | File Declass Date: This field indicates the declassifying date. | 8 | Follows NITF default values | O |

TABLE A-1-continued

PFI File Header (Binary)

| FIELD ID | NAME | SIZE | VALUE RANGE | TYPE |
|---|---|---|---|---|
| FSDCXM | File Declass Exemption: This field indicates reasons for automatic file declassification exemption. | 4 | Follows NITF default values | O |
| FSDG | File Downgrade: This field indicates the file classification for downgrade. | 1 | Follows NITF default values | O |
| FSDGDT | File Downgrade Date: This field indicates the date of file classification downgrade. | 8 | Follows NITF default values | O |
| FSCPYS | File Number of Copies: This field indicates the number of copies of the file. | 5 | 00000 | O |
| FSCLTX | File Class Text: This field provides additional file classifying information. | 43 | Follows NITF default values | |
| FSCATP | File Class Author Type: This field indicates the type of classifying authority. | 1 | Follows NITF default values | O |
| FSCAUT | File Class Author: This field indentifies the classifying authority. | 40 | Follows NITF default values | O |
| FSCRSN | File Class Reason: This field indicates the reason for file classification. | 1 | Follows NITF default values | O |
| FSSRDT | File Security SRC Date: This field indicates the date of the source used to derive classification. | 8 | Follows NITF default values | O |
| FSCTLN | File Control Number: This field includes the file's valid security control number. | 15 | Follows NITF default values | O |
| FSCOP | File Copy Number: This field includes the file copy number. | 5 | 00000 | R |
| FSCPYS | File Number of Copies: This field includes the total number of file copies. | 5 | 00000 | R |
| ENCRYP | Encryption: This field includes the value zero. | 1 | 0 | R |
| FBKGC | File Background Color: This field includes the colors Red, Green, & Blue. | 3 | Follows NITF default values | |
| ONAME | Originator's Name: This field identifies the organization that originated the file. | 24 | Customizable as a PFIG option | O |
| OPHONE | Originator's Phone Number: This field includes a valid phone number of the originating operator. | 18 | Follows NITF default values | |
| FL | File Length: This field specifies the entire PFI file in bytes. | 12 | 388 - 999999999999 | R |
| HL | NITF File Header Length: This field specifies the length of the Header file in bytes. | 6 | Follows NITF default values | R |
| NUMI | Number of Images: This field specifies a zero to indicate that there is no image present within the file. | 3 | 002 | R |
| LISHn | Length of Subheader 0: This field includes the image subheader length in bytes. | 6 | Follows NITF default values | C |
| LIn | Length of Image 0: This field includes image length in bytes. | 10 | Follows NITF default values | C |
| LISH001 | Length of Subheader 1: This field includes the first ordered image subheader segment in bytes. | 6 | Follows NITF default values | C |
| LI001 | Length of Image 1: This field includes the first ordered image length in bytes. | 10 | Follows NITF default values | C |
| LSn | Number of Graphics: This field includes the bytes for the nth graphic subheader. | 6 | Follows NITF default values | C |
| NUMX | Reserved for future use: This field is reserved for future use. | 3 | 000 | R |

TABLE A-1-continued

PFI File Header (Binary)

| FIELD ID | NAME | SIZE | VALUE RANGE | TYPE |
|---|---|---|---|---|
| NUMT | Number of Text Files: This field includes the number of separate text segments within the file. | 3 | 000 or 1 if GRG is present | R |
| LTSHn | Length of Text Subheader 0: This field includes a valid length for the text subheader in bytes. | 4 | Follows NITF default values | C |
| LTn | Length of Text File: This field includes the valid length of the text segment in bytes. | 5 | Follows NITF default values | C |
| NUMDES | Number of DES: This field includes the number of separate Data Extension Segments included in the file. | 3 | 000 | R |
| NUMRES | Number of RES: This field includes the number of separate Reserve Extension Segments in file. | 3 | 000 | R |
| UDHDL | User-Defined Length: This field includes the value of BCS zeros if no TREs are included in the user defined Headek. | 5 | 00000 | R |
| XHDLOFL | Extended Header Data Overflow: This field includes BCS zeros if the TREs in the extended Header do not flow into the data extension segment. | 5 | 00000 | C |

R = Required
C = Conditional
O = Optional

PFI Image Header. FIG. 1 identifies two Image segments, 2, 4, and associated Image Headers in the PFI Header file. PFI Image Header 0 (initial Header file indicated by the value "0" in the table/code) 6 specifies the Image Header with the "displayable" image data included within. The secondary PFI Image Header (Header indicated by the value "1" in the table/code) 8 specifies the Image Header with the "non-displayable" image data included within. Table A-2 indicates all fields included within both Image Headers; however, the field ID, name, size and value range can vary without departing from the invention. A 'B' in the Type column identifies information where data will change according to each individual PFI Header file.

TABLE A-2

PFI Image Headers (2)

| FIELD ID | NAME | SIZE | VALUE RANGE | TYPE |
|---|---|---|---|---|
| IM | File Part Type: This field includes the characters "IM" to identify the subheader as an image subheader. | 2 | IM | R |
| IID | Image Identifier 1: This field includes the image ID included within the file. It will identify the data as PFI Image or PFI Data. | 10 | Image Header 0 includes: PFI Image Image Header 1 includes: PFI Data | R B |
| IDATIM | Image Date and Time: This field includes the date and time of the original image. Values start with the four digit year, two digit month, two digit days, hours, minutes, and seconds. | 14 | YYYYMMD DHHMMSS | R B |

TABLE A-2-continued

PFI Image Headers (2)

| FIELD ID | NAME | SIZE | VALUE RANGE | TYPE |
|---|---|---|---|---|
| TGTID | Target Identifier: This field includes the identification of the primary target in the format. | 17 | Follows NITF default values | O |
| IID2 | Image Identifier 2: This field includes a second image identifier. | 10 | File Format Version | O B |
| ISCLAS | Image Security Class: This field includes a classification level based on the originating imagery. | 1 | Follows NITF default values | R |
| ISCLSY | Image Security Class System: This field indicates the national or multinational security system that classified the image. | 2 | Follows NITF default values | R |
| ISCODE | Image Codewords: This field identifies the security compartments associated with the image. | 40 | Follows NITF default values | O |
| ISCTLH | Image Control: This field includes additional security control and/or handling instructions for the image. | 2 | Follows NITF default values | O |
| ISREL | Image Release Instructions: This field includes a list of countries where release of imagery is authorized. | 20 | Follows NITF default values | R |
| ISDCTP | Image Declass Type: This field indicates the security declassification | 2 | Follows NITF default values | O |

TABLE A-2-continued

PFI Image Headers (2)

| FIELD ID | NAME | SIZE | VALUE RANGE | TYPE |
|---|---|---|---|---|
| | type or downgrading instructions for the image. | | | |
| ISDCDT | Image Declass Date: This field indicates a date to which the image will be or has been declassified. | 8 | Follows NITF default values | O |
| ISDCXM | Image Declass Exemption: This field indicates a reason for the image's automatic exemption from declassification. | 4 | Follows NITF default values | O |
| ISDG | Image Downgrade: This field indicates the classification level to which the image will be downgraded. | 1 | Follows NITF default values | O |
| ISDGDT | Image Downgrade Date: This field indicates the date on which the image. is to be downgraded. | 8 | Follows NITF default values | O |
| ISCLTX | Image Class Text: This field is used to provide additional information about the image classification. | 43 | Follows NITF default values | O |
| ISCATP | Image Class Author Type: This field indicates the type of authority used to classify the image. | 1 | Follows NITF default values | O |
| ISCAUT | Image Class Authority: This field identifies the classification authority and is dependent on the classification authority type. | 40 | Follows NITF default values | O |
| ISCRSN | Image Class Reason: This field includes values indicating the reason for image classification. | 1 | Follows NITF default values | O |
| ISSRDT | Image Security SRC Date: This field indicates the date of the source used for classification of the image. | 8 | Follows NITF default values | O |
| ISCTLN | Image Control Number: This field includes an image control number associated with the image. | 15 | Follows NITF default values | O |
| ENCRYP | Encryption: This field includes the value BCS zero according to NITF specifications. | 1 | Follows NITF default values | O |
| ISORCE | Image Source: This field includes the PFI originating source (PFIG/DPSS-SM). If the image originates from PFIG, this field should include the DPPDB (indicated by D) number segment and left and right offset X, Y values. If the image originates from DPSS-SM, it includes the Tactical Image name. PFIG source example: D01022496-0703-9003-24785-9003-24785 DPSS-SM source example: Baghdad.ntf | 42 | Originating source, either: PFIG: D#-Segment ID-Left Offset X,Y-Right Offset X,Y or DPSS-SM-Tactical Image Name | R B |
| NROWS | Number of Rows: This field includes the total number of rows of significant pixels within the image. The number of rows of significant pixel values will be determined by the Image Header type. Image Header 0 includes the displayable image. Image Header 1 includes a non-displayable image. These values are specified in the value range. | 8 | Image Header 0 indicates values: 0-00001024; 0-00002048; 0-00004096 Image Header 1 indicates value: 00000001 | R B |
| NCOLS | Number of Columns: This field includes the total number of columns of significant pixels within the image. These values are encoded in the binary format. | 8 | Image Header indicates values: 0-00001024; 0-00002048; 0-00004096 Image Header 1 indicates values based on length of binary data | R B |
| PVTYPE | Pixel Value Type: This field indicates the computer representation type used for each pixel for each band. | 3 | Follows NITF default values. | R |
| IREP | Image Representation: This field indicates the required processing for the image display. Image Header 0 includes the displayable image. Image Header 1 includes a non-displayable image. Image identifiers are specified in the value range. | 8 | Image Header 0 (displayable image) indicates: NITF default values. Image Header 1 (non-displayable image) will indicate: NODISPLY | R B |
| ICAT | Image Category: This field indicates the image category. | 8 | Follows NITF default values | R |
| ABPP | Actual bits-per-pixel: This field indicates the number of "significant bits" in each band of each pixel without compression. | 2 | 08 | R |
| PJUST | Pixel Justification: This field indicates whether significant bits are left or right justified. This is dependent on whether the ABPP is not equal to NBPP. | 1 | L (left justification) | R |
| ICORDS | Image Coordinate Representation: This field indicates the type of coordinate representation. | 1 | G (geolocation) | R |
| IGEOLO | Image Geographic Location: This field includes the four corner points of the PFI image. | 60 | Follows NITF default values | C |
| NICOM | Number of Comments: This field includes the number of ICOM fields that hold free text image comments. | 1 | Follows NITF default values | .R |
| IC | Image Compression: This field indicates the form of compression used in representing the image data. It also specifies if a PFI file is JPEG compressed or not. | 2 | NC (no compression) or C3 (JPEG compression) | R B |

TABLE A-2-continued

PFI Image Headers (2)

| FIELD ID | NAME | SIZE | VALUE RANGE | TYPE |
|---|---|---|---|---|
| COMRAT | Compression Rate Code: This field shall be present on condition that the IC field includes appropriate codes. This indicates the compression rate for the image. | 4 | Follows NITF default values and depends on IC value field | O |
| NBANDS | Number of Bands: This field includes the number of data bands within the image. | 1 | Follows NITF default values | R |
| XBANDS | Multi-spectral bands: This field is dependent on NBANDS value. | 5 | Follows NITF default values | C |
| IREPBAND | Band Representation 0: This field indicates the processing required to display the band with regards to the image type in the IREP value. | 2 | Follows NITF default values | R |
| ISUBCAT | Band Subcategory: This field indicates the significance of the "n" bands with regard to the ICAT field. | 6 | Follows NITF default values | O |
| IFC | Filter Condition: This field includes the value N to represent none. | 1 | Follows NITF default values | R |
| IMFLT | Filter Code: This field is reserved for future use. | 3 | Follows NITF default values | O |
| NLUTS | Number of LUTS for the nth Image Band: This field indicate the number of LUTS associated with the "nth" band of the image. | 1 | Follows NITF default values | R |
| ISYNC | Image Sync Code: This field is reserved for future use. | 1 | Follows NITF default values | R |
| IMODE | Image Mode: This field indicates how image pixels are stored in the NITF file. | 1 | B (band interleaved by block) | R |
| NBPR | Blocks per Row: This field includes the number of image blocks in a row of blocks in the horizontal direction. | 4 | Follows NITF default values | R |
| NBPC | Blocks per Column: This field includes the number of image blocks in a column of blocks in the vertical direction. | 4 | Follows NITF default values | R |
| NPPBH | Pixels per Block (H): This field includes the number of pixels horizontally in each block of the image. | 4 | Follows NITF default values | R |
| NPPBV | Pixels per Block (V): This field includes the number of pixels vertically in each block of the image. | 4 | Follows NITF default values | R |
| NBPP | Bits per Pixel: This field is dependent on the IC field. | 2 | 08 | R |
| IDLVL | Image display Level: This field indicates the display level relative to other displayed file components in a composite display. | 3 | Follows NITF default values | R |
| IALVL | Attachment Level: This field indicates the attachment level of the image. | 3 | Follows NITF default values | R |
| ILOC | Image Location: This is the location of the first pixel of the first line of the image. It includes the image location offset from ILOC/SLOC value of the segment that the image is attached to or from the origin of the CCS when the image is unattached. | 10 | Follows NITF default values | R |
| IMAG | Image Magnification: This field includes-the template magnification level. This applies to Image Header 1, which is indicated as the template. | 4 | Follows NITF default values | R B |
| UDIDL | User Defined Length: This field is dependent on whether the TREs exist: otherwise, BCS zeros will denote that there are no TREs. | 5 | 00000 | R |
| IXSHDL | Extended Subheader Length: This field includes the TRE indicated as Block A. See Table A-4 for segment specifications. | 5 | 00123 | R B |

R = Required
C = Conditional
O = Optional

Text File Header information. The Text Header specifies Gridded Reference Graphics (GRG) labels for buildings and intersections. In some embodiments, numerical values indicate buildings and alphabetical values indicate intersections. However, in other embodiments, alphabetical values indicate buildings and numerical values indicate intersections. Table A-3 specifies Text File Header fields used in an embodiment of the invention that includes Text File Header Information. The table identifies Text File Headers using a field ID, name (and associated information/function), size, and value range; however, the field ID, name, size and value range can vary without departing from the invention.

Buildings:

Numeric values are positioned on an X Pixel and Y Pixel and is divided into categories of "macro" and "micro" labels. A "macro" label is the beginning number to a series of "micro" numbers. In Table A-3, for example, numbers 10 and 20 start off the series to number sets 11-15 and 21-25. These number sets are defined as the "micro" labels. The number of "micro" labels assigned depends on mission requirements. Table A-3 provides an example of the GRG labeling system in order to identify the hierarchy of GRG text labels.

Intersections:

Alphabetical values have been added to the "Text File Data 0" field to mark intersections or other physical features on the image.

TABLE A-3

Text File Header

| FIELD ID | NAME | SIZE | VALUE RANGE | TYPE |
|---|---|---|---|---|
| TE | File Part Type: This field includes TE to identify the subheader as a "text subheader." | 2 | TE | R |
| TEXTID | Text Identifier: This field includes identification code GRG for Gridded Reference Graphics. This is associated with the text item. | 3 | GRG | R |
| TXTDT | Text Date and Time: This field includes the time of origination of the text. | 14 | YYYYMMDDhhmmss | R |
| TXTITL | Text Title: This field includes the text title. | 80 | Follow NITF default values | O |
| TSCLAS | Text Security Classification: This field includes the value "S" for a Secret classification to indicate the GRG is secret. | 1 | S | R |
| TSCLSY | Text Security Classification System: This field indicates the national or multinational security system that classified the text. | 2 | Follow NITF default values | O |
| TSCODE | Text Codewords: This field indicates the security compartments associated with the text. | 11 | Follow NITF default values | O |
| TSCTLH | Text Control and Handling: This field includes additional security control and/or handling, instructions. | 2 | Follow NITF default values | O |
| TSREL | Text Releasing Instructions: This field includes the classification releasability code of the image. | 2 | Follows NITF default values | R |
| TSDCTP | Text Declassification Type: This field indicates the type of security declassification or downgrading instructions. | 2 | Follow NITF default values | O |
| TSDCDT | Text Declassification Date: This field indicates the date on which the text is or has been declassified. | 8 | Follow NITF default values | O |
| TSDCXM | Text Declassification Exemption: This field indicates the reason the text is exempt from automatic declassification. | 4 | Follow NITF default values | O |
| TSDG | Text Downgrade: This field indicates the classification level to which a text is to be downgraded. | 1 | Follow NITF default values | O |
| TSDGDT | Text Downgrade Date: This field indicates the date on which the text is to be downgraded. | 8 | Follow NITF default values | O |
| TSCLTX | Text Classification Text: This field indicates additional information about text classification | 43 | Follow NITF default values | O |
| TSCATP | Text Classification Authority Type: This field indicates the type of authority used to classify the text. | 1 | Follow NITF default values | O |
| TSCAUT | Text Class Authority: This field identifies the classification authority and is dependent on the TSCATP. | 40 | Follow NITF default values | O |
| TSCRSN | Text Classification Reason: This field indicates the reason for classifying the text | 1 | Follow NITF default values | O |
| TSSRDT | Text Security Source Date: This field indicates the source date used to derive text classification. | 8 | Follow NITF default values | O |
| TSCTLN | Text Security Control Number: This field includes a control number associated with text. | 15 | Follow NITF default values | O |
| ENCRYP | Encryption: This field includes BCS zero until specified by NGA. | 1 | 0 | R |
| TXTFMT | Text Format: This field indicates the format or type of text data. | 3 | STA | R |
| TXSHDL | Text Extended Subheader Data Length: This field represents that there are no TREs included in the text subheader. | 5 | 00000 | R |

R = Required
C = Conditional
O = Optional

Some embodiments include a tagged record extension ("TRE") segment that supports coordinate accuracy of a geo-location output for the four corner points of the PFI. Table A-4 provides a table of Header fields for embodiments including a controlled TRE including additional geo-location identifiers intended to improve accuracy in coordinate output. The table identifies Text File Headers using a field ID, name (and associated information/function), size, and value range; however, the field ID, name, size and value range can vary without departing from the invention. The TRE is located in Image Header 0 and includes data associated with the Image Geographic Location (IGEOLO). The TRE provides enhanced precision accuracy of the four corner points.

TABLE A-4

Block A TRE

| Field | Name | Size | Value Range | Type |
|---|---|---|---|---|
| EXTENSION ID | Extension ID: This field includes the unique extension identifier "Block A" for TRE segment identification. | 6 | BLOCKA | R |
| TAGGED RECORD LENGTH | Tagged Record Length: This field indicates the length of the TRE. | 5 | 00123 | R |
| BLOCK_INSTANCE | Block Instance: Block number of the image block. | 5 | 00002 | R |
| N_GRAY | Gray Fill Pixels: This field indicates the number of gray fill pixels. | 5 | 00005 | R |
| L_LINES | Line Count: This field indicates number of rows. | 5 | 00005 | R |
| LAYOVER_ANGLE | Layover Angle: In regards to SAR Imagery, this field indicates the angle between the first row of pixels and the layover direction in a clockwise direction. | 5 | 00003 | R |
| SHADOW_ANGLE | Shadow Angle: In regards to SAR imagery, this field indicates the angle between the first row of pixels and the layover direction measured in a clockwise direction. | 5 | 00003 | R |

TABLE A-4-continued

Block A TRE

| Field | Name | Size | Value Range | Type |
|---|---|---|---|---|
| FIELD6 | Reserved 1: This field indicates this Data Mapping ID is reserved and not for present use. | 5 | 00016 | R |
| FRLC_LOC | First Row/Last Column: This field indicates the location of the first row and last column of the image block. | 5 | 00021 | R |
| LRLC_LOC | Last Row/Last Column: This field indicates the location of the last row and last column of the image block. | 5 | 00021 | R |
| LRFC_LOC | Last Row/First Column: This field indicates the last row and first column of the image block. | 5 | 00021 | R |
| FRFC_LOC | First Row/First Column: This field indicates the first row and first column of the image block. | 5 | 00021 | R |
| FIELD11 | Reserved 2: This field indicates this Data Mapping ID is reserved and not for present use. | 5 | 00005 | R |

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A non-transitory computer readable medium encoded with at least one data structures, the at least one data structures comprising an image file format comprising:
   a Precision Fires Image (PFI) file Header that defines information needed to display a PFI, said PFI being an overhead satellite image of an object with a geo-referenced, three dimensional (3-D) template of said object; said geo-referenced three dimensional (3-D) template providing a translation from image coordinates to ground coordinates;
   an image segment pertaining to a displayable image; and
   an image segment pertaining to a non-displayable template image;
   wherein each of said image segment pertaining to a displayable image and said image segment pertaining to a non-displayable template image comprises:
      a plurality of Header fields; and
      a plurality of Text File Header fields; and
      a tagged record extension segment that supports coordinate accuracy of a geo-location output for four corner points of said PFI,
   wherein said PFI File Header comprises:
      a first PFI file Header field for indicating an originating organization and a version of an application used to create said PFI;
      a second PFI file Header field for specifying a date said PFI was created; and
      a third PFI file Header field for specifying said PFI as a PFI and also indicating an originating PFI generating application, image corner points of said PFI, and said date said PFI was created,
   wherein said plurality of Image Header field comprises:
      an image identifier field for identifying data as PFI image or PFI Data;
      an image date and time field of an original image that was used to generate said PFI;
      an image source field for indicating the originating source of said PFI;
      a number of rows field for including the total number of rows of significant pixels within said PFI;
      a number of columns field for including the total number of columns of significant pixels within said PFI;
      an image representation field for indicating the required processing for display of said PFI;
      an image compression field for indicating a form of compression used in representing image data of said PFI;
      an image magnification field; and
      an extended subheader length field.

2. The computer readable medium of claim 1 wherein said image segment pertaining to said displayable image comprises data structures for storing an underlying image that provides visible geographic features.

3. The computer readable medium of claim 1 wherein said image segment pertaining to said non-displayable template image serves as a non-destructive overlay to said image segment pertaining to said displayable image.

4. The computer readable medium of claim 1 wherein said image segment pertaining to said non-displayable template image comprises:
   correlated DPPDB stereo reference data; and
   extended binary data allocated for PFI implementation.

5. The computer readable medium of claim 4 wherein said image file format is configured to correlate said image segment pertaining to said non-displayable template image with said image segment pertaining to said displayable image.

6. The computer readable medium of claim 1 further comprising a GRG Text Data Field in an NITF header to allow operators to add alphabetical text to intersections and numerical values to buildings during generation of said PFI.

7. The computer readable medium of claim 6 wherein said numerical values comprises macro and micro labels.

8. The computer readable medium of claim 7 wherein said plurality of Text File Header fields comprises:
   a Text identifier field;
   a Text date and time field;
   a Text Security Classification field; and
   a Text Releasing instructions field.

9. The computer readable medium of claim 8 further comprising an image file structure having JPEG compression capability.

10. The computer readable medium of claim 8 further comprising an image file structure having JPEG 2000 compression capability.

11. A non-transitory computer readable medium encoded with at least one data structures, the at least one data structures comprising an image file format comprising:
   a Precision Fires Image (PFI) file Header that defines information needed to display a PFI, said PFI being an overhead satellite image of an object with a geo-referenced, three dimensional (3-D) template of said object; said geo-referenced three dimensional (3-D) template providing a translation from image coordinates to ground coordinates;

an image segment pertaining to a displayable image;

an image segment pertaining: to a non-displayable template image defined using the following syntax and including a scale integer:

```
struct PFIData
{
Smallint row;
Smallint col;
float TemplateX;
float TemplateY;
float TemplateZ;
float TemplateDir;
};
struct PFIHeader
{
float Version;
bool IsSAR;
float CEP;
float CEM;
float CE90;
float LEP;
float LEM;
float LE90;
float SigmaX2;
float SigmaY2;
float SigmaXY;
double AimpointX;
double AimpointY;
double .AimpointZ;
int scale;
};
``` a plurality of Image Header fields;

a plurality of Text File Header fields;

a tagged record extension segment that supports coordinate accuracy of a geo-location output for four corner points of said PFI;

wherein said PFI file Header comprises a plurality of PFI file Header fields;

wherein said plurality of PFI file Header fields comprises:

a first PFI file Header field for indicating an originating organization and a version of an application used to create said PFI;

a second PFI file Header field for specifying a date said PFI was created; and a third PFI Header field for specifying said PFI as a PFI and also indicating an originating PFI generating application, image corner points of said PFI, and a date said PFI was created;

wherein said plurality of Image Header fields comprises:

an image identifier field for identifying data as PFI image or PFI Data;

an image date and time field of an original image that was used to generate said PFI;

an image source field for indicating an originating source of said PFI;

a number of rows field for including a total number of rows of significant pixels within said PFI;

a number of columns field for including a total number of columns of significant pixels within said PFI;

an image representation field for indicating a required processing for displaying said PFI;

an image compression field for indicating a form of compression used in representing image data of said PFI;

an image magnification field; and an extended subheader length field;

and a Gridded Reference Graphic Text Data Field in a National Imagery Transmission Format header; wherein said Gridded Reference Graphic Text Data Field is adapted to allow addition of alphabetical text to intersections and numerical values to buildings during generation of said PFI, wherein said numerical values comprises macro and micro labels.

* * * * *